US011530311B2

(12) United States Patent
Thompson et al.

(10) Patent No.: US 11,530,311 B2
(45) Date of Patent: *Dec. 20, 2022

(54) POLYESTER RESINS WITH PARTICULAR CARBON BLACK AS A REHEAT ADDITIVE IN THE PRODUCTION OF STRETCH BLOW MOLDED BOTTLES AND CONTAINERS (71) Applicant: DAK AMERICAS, LLC, Charlotte, NC (US)

(72) Inventors: David Eugene Thompson, Wilmington, NC (US); Helen Jane Codd, Wilmington, NC (US)

(73) Assignee: DAK AMERICAS, LLC, Charlotte, NC (US)

( * ) Notice: Subject to any disclaimer, the term of this patent is extended or adjusted under 35 U.S.C. 154(b) by 1026 days.

This patent is subject to a terminal disclaimer.

(21) Appl. No.: 16/237,415

(22) Filed: Dec. 31, 2018

(65) Prior Publication Data
US 2019/0136010 A1 May 9, 2019

Related U.S. Application Data (62) Division of application No. 13/349,072, filed on Jan. 12, 2012, now Pat. No. 10,240,021.

(51) Int. Cl.
B29C 49/08 (2006.01)
C08K 3/04 (2006.01)
B29C 44/56 (2006.01)
B29C 59/16 (2006.01)
B29C 49/64 (2006.01)
B29C 49/06 (2006.01)
B29C 49/00 (2006.01)
B29C 49/12 (2006.01)
B29K 667/00 (2006.01)
B29C 35/08 (2006.01)
B29K 67/00 (2006.01)
B29K 105/16 (2006.01)

(52) U.S. Cl.
CPC ............ C08K 3/04 (2013.01); B29C 44/5627 (2013.01); B29C 49/0005 (2013.01); B29C 49/06 (2013.01); B29C 49/086 (2022.05); B29C 49/12 (2013.01); B29C 49/6418 (2013.01); B29C 59/16 (2013.01); B29C 2035/0822 (2013.01); B29K 2067/00 (2013.01); B29K 2105/16 (2013.01); B29K 2667/00 (2013.01); C08K 2201/011 (2013.01); Y10T 428/1397 (2015.01)

(58) Field of Classification Search
CPC .................................... B29C 49/00
See application file for complete search history.

(56) References Cited

U.S. PATENT DOCUMENTS

| | | | |
|---|---|---|---|
| 3,206,419 | A | 9/1965 | Pritchard et al. |
| 4,080,354 | A | 3/1978 | Kramer |
| 4,194,641 | A | 3/1980 | Gaiser |
| 4,250,078 | A | 2/1981 | McFarlane et al. |
| 4,408,004 | A | 10/1983 | Pengilly |
| 4,420,581 | A | 12/1983 | McFarlane et al. |
| 4,447,595 | A | 5/1984 | Smith et al. |
| 4,476,272 | A | 10/1984 | Pengilly |
| 4,481,314 | A | 11/1984 | Rule |
| 4,535,118 | A | 8/1985 | Pengilly |
| 4,959,406 | A | 9/1990 | Foltin |
| 5,300,350 | A | 4/1994 | Grosser et al. |
| 5,419,936 | A | 5/1995 | Tindale |
| 5,529,744 | A | 6/1996 | Tindale |
| 5,898,060 | A | 4/1999 | Suzuki et al. |
| 5,925,710 | A | 7/1999 | Wu et al. |
| 6,022,920 | A | 2/2000 | Maxwell et al. |
| 6,197,851 | B1 | 3/2001 | Maxwell et al. |
| 6,358,578 | B1 | 3/2002 | Otto et al. |
| 6,503,586 | B1 | 1/2003 | Wu et al. |
| 6,602,568 | B2 | 8/2003 | Semersky |
| 6,660,792 | B2 | 12/2003 | Massey et al. |
| 6,777,048 | B2 | 8/2004 | Quillen et al. |
| 7,129,317 | B2 | 10/2006 | Moore et al. |
| 7,189,777 | B2 | 3/2007 | Quillen et al. |
| 7,300,967 | B2 | 11/2007 | Xia |
| 7,303,795 | B2 | 12/2007 | Neal et al. |
| 7,358,324 | B2 | 4/2008 | Chen et al. |
| 7,368,523 | B2 | 5/2008 | Xia et al. |
| 7,439,294 | B2 | 10/2008 | Xia |
| 7,479,517 | B2 * | 1/2009 | Kulkarni ................ B82Y 30/00 524/495 |

(Continued)

FOREIGN PATENT DOCUMENTS

| | | |
|---|---|---|
| CA | 2 560 567 A1 | 10/2005 |
| CN | 101691421 | 4/2010 |

(Continued)

OTHER PUBLICATIONS

Mexican Office Action dated Sep. 18, 2019 in Patent Application No. MX/a/2014/008473.

(Continued)

Primary Examiner — Atul P. Khare
(74) Attorney, Agent, or Firm — Oblon, McClelland, Maier & Neustadt, L.L.P.

(57) ABSTRACT

Provided is a polyester or co-polyester resin used in the manufacture of preforms suitable for making bottles and containers containing a carbon black, particularly lamp black carbon black, with a primary particle size in a range of from 100 to 160 nanometers.

8 Claims, 4 Drawing Sheets

(56) References Cited

U.S. PATENT DOCUMENTS

| | | | |
|---|---|---|---|
| 7,510,751 B2 * | 3/2009 | Neal | ................... B29C 49/0005 264/535 |
| 7,662,880 B2 | 2/2010 | Xia | |
| 7,816,436 B2 | 10/2010 | Harrison et al. | |
| 8,039,577 B2 | 10/2011 | Xia et al. | |
| 8,552,099 B2 * | 10/2013 | Jarvis | ...................... C08L 67/02 524/410 |
| 2004/0030029 A1 * | 2/2004 | Weinhold | ................. C08K 3/04 524/439 |
| 2004/0101642 A1 | 5/2004 | Quillen et al. | |
| 2004/0219319 A1 * | 11/2004 | Brooks | ..................... C08K 3/04 264/550 |
| 2004/0236066 A1 | 11/2004 | Moore et al. | |
| 2004/0249113 A1 | 12/2004 | Quillen et al. | |
| 2005/0153086 A1 | 7/2005 | Moore et al. | |
| 2006/0008645 A1 | 1/2006 | Kishimoto et al. | |
| 2006/0099364 A1 | 5/2006 | Harrison | |
| 2006/0110557 A1 | 5/2006 | Xia et al. | |
| 2006/0205855 A1 | 9/2006 | Xia | |
| 2007/0167547 A1 | 7/2007 | Tammaji Kulkarni et al. | |
| 2007/0248778 A1 | 10/2007 | Kezios et al. | |
| 2007/0260002 A1 | 11/2007 | Xia et al. | |
| 2008/0058495 A1 | 3/2008 | Quillen et al. | |
| 2009/0057961 A1 * | 3/2009 | McKeeman | ........ B29C 49/0005 264/532 |
| 2009/0306313 A1 | 12/2009 | Nichols | |
| 2010/0179270 A1 | 7/2010 | Zoch | |

FOREIGN PATENT DOCUMENTS

| | | | | |
|---|---|---|---|---|
| EP | 0933124 A1 * | 4/1999 | ............ | F16L 59/028 |
| EP | 2 802 614 B1 | 12/2017 | | |
| FR | 2541298 A2 * | 8/1984 | .......... | C08F 299/065 |
| JP | 9143350 | 6/1997 | | |
| KR | 2007-0084029 | 8/2007 | | |
| WO | WO-2008087041 A1 * | 7/2008 | .............. | C08L 23/10 |

OTHER PUBLICATIONS

IARC Monographs on the Evalulation of Carcinogenic Ricks to Humans, Carbon Balck, titanium Dioxide and Talc, vol. 93 , p. 47 (2010).
Temple C. Patton "Pigment Handbook vol. I—Properties and Applications"John Wiley & Sons, New York pp. 742-743 (1973).
Katz et al., Handbook of Fillers for Plastics, Van Nostrand Reiinold, New York, p. 395 (1987).
International Search Report and the Written Opinion dated Mar. 12, 2013, in International Application No. PCT/US 13/21106.
Letter to PTO regarding Prior Cell 2010.
First Chinese Office Action dated Jun. 16, 2015 in Chinese Patent Application No. 201380005401.X with English translation.
Singapore Examination Report and Search Report dated May 15, 2015 in Application No. 11201403992P.
Eurasian Office Action dated Nov. 24, 2015 in Patent Application No. 201491360/28 (with English language translation).
Second Office Action dated Jan. 21, 2016, in corresponding Chinese Patent Application No. 20138005401.X (with English-language Translation).
Notice of Preliminary Rejection dated Nov. 16, 2018, in Korean Patent Application No. 2014-7019144 filed Jan. 11, 2013).
Office Action dated Mar. 5, 2019 in the corresponding Canadian Application No. 2,860,766 4 pages.
Brazilian Office Action in Brazilian Patent Application No. 112014017071-1 (with English translation), 6 pages.

* cited by examiner

Fig. 3
Preform L*

POLYESTER RESINS WITH PARTICULAR CARBON BLACK AS A REHEAT ADDITIVE IN THE PRODUCTION OF STRETCH BLOW MOLDED BOTTLES AND CONTAINERS

CROSS REFERENCE TO RELATED APPLICATION

The present application is a divisional of Ser. No. 13/349,072, now allowed, having a filing date of Jan. 12, 2012.

FIELD OF THE INVENTION

The present invention relates to the improved reheat temperature, clarity, and color of preforms, and subsequently bottles and containers, made from polyethylene terephthalate resins by adding a carbon black, preferably lamp black carbon black (also called Pigment Black 6), with a particle size of 100 to 160 nanometers.

BACKGROUND OF THE INVENTION

Because of their strength, heat resistance, and chemical resistance, polyester containers, films, and fibers are an integral component in numerous consumer products manufactured worldwide. In this regard, most commercial polyester used for containers, films, and fibers is polyethylene terephthalate polyester (or PET).

Polyester resins, especially polyethylene terephthalate and its copolyesters, are also widely used to produce rigid packaging, such as food and beverage containers. Polyester containers produced by stretch-blow molding possess outstanding strength and shatter resistance, and have excellent gas barrier and organoleptic properties. Consequently, such light-weight plastics have virtually replaced glass in packaging numerous consumer products (e.g., carbonated soft drinks, water, fruit juices, and peanut butter).

In conventional processes for making polyester container resins, modified polyethylene terephthalate resin is polymerized in the melt phase to an intrinsic viscosity of about 0.6 deciliters per gram (dl/g), whereupon it is further polymerized in the solid phase to achieve a higher intrinsic viscosity that is better suited to container formation. Thereafter, the polyethylene terephthalate may be injection molded into preforms, which in turn may be stretch-blow molded into bottles or other containers.

To achieve fast production rates in the stretch-blow molding process, the preforms are heated in an infrared oven. The use of additives that absorb infrared radiation speed the heating of the preforms allowing for faster production rates. Unfortunately, these additives reduce the L* color of the preforms, causing them to appear darker. Reheat additives can also make the preforms appear cloudier or hazier, which is not desired in the industry.

Therefore, there is a need for polyethylene terephthalate resin containing a reheat additive that can maintain a high L* color value in preforms while maintaining good clarity and a fast reheat.

The production of preforms to be stretch-blow molded into bottles or containers benefits from the use of an infrared absorbing additive to improve the cycle time in the manufacturing process. The prior art for reheat additives includes carbon blacks with a particle size between 10 and 500 nanometers (Pengilly: U.S. Pat. Nos. 4,408,400; 4,476,272, 4,535,118), metallic antimony particles from residual catalyst (Tindale: U.S. Pat. Nos. 5,149,936 and 5,529,744), and others well known in the art. These include, but are not limited to, black iron oxide, iron phosphide, copper chromite spinel, and titanium nitride. Each of the reheat additives absorbs infrared radiation to improve the heating rate of preforms in the stretch blow molding process.

However, each additive, to some degree, reduces the L* color value of the preform making the preform darker. These additives also increase the haze in the preform making the preforms cloudier.

The Pengilly patents (U.S. Pat. Nos. 4,408,400; 4,476,272; and 4,535,118) state that the preferred mode of the invention is to use either a furnace or channel carbon black with a primary particle size of 15 to 30 nanometers. The preferred additive concentration has been given as 1.5 to 3.5 parts by weight per million parts by weight of polyester resin.

The different types of carbon blacks are not referenced in the Pengilly patents. There are many different types of carbons, each with specific ranges of particle sizes and characteristics. Several common carbon black types include furnace, thermal, channel, lamp black, and bone carbon black.

Harrison et al. (U.S. Pat. No. 7,816,436) describe the use of thermal or furnace carbon blacks in PET and PP preforms, wherein the preferred particle size of the carbon black particles is in a range of 200 to 500 nanometers, preferably 250 to 300 nm, in an amount of 3 to 50 ppm, to improve reheat performance, They do not discuss other types of carbon black materials.

Of the above carbon black materials, the furnace carbon black is by far the most common and widely manufactured. The furnace and channel carbon blacks are materials with a primary particle size range from 5 to 100 nanometers. The process typically uses aromatic oils as feedstock. The thermal carbon blacks have much larger particle sizes between roughly 250 and 340 nanometers. The thermal carbon blacks are made from natural gas by cracking away hydrogen against heated refractory bricks in a dual reactor system. Lamp black carbon black forms a distinct species of carbon black with a primary particle size from 100 to 160 nanometers. The lamp black carbon black is typically produced by burning high purity waxes and/or oils and collecting the soot. The lamp black process is one of the oldest processes known for forming carbon black.

We have found that an optimum exists for maximizing preform reheat temperature while maintaining good preform clarity and L* color value. Surprisingly, the carbon blacks which an average particle size in a range of from 100 to 160 nanometers, particularly lamp black carbon blacks, provide a faster reheat than the furnace carbon blacks, but show an improvement in haze at equivalent reheat temperatures compared to the thermal carbon blacks. Particularly, this invention has shown that a lamp black carbon black with a particle size range between 100 and 160 nanometers yields a fast reheat rate with excellent L* color and clarity.

BRIEF SUMMARY OF THE INVENTION

It is an object of this invention to provide a polyester resin to make preforms, and subsequently bottles and other containers that yield a fast stretch-blow molding cycle time through the use of a carbon black, particularly lamp black carbon black, reheat additive. Such a reheat additive provides the fast reheat with a high L* color value and good clarity compared to other reheat mechanisms.

DETAILED DESCRIPTION OF THE INVENTION

Polyester and/or co-polyester comprising preforms having a carbon black additive, preferably lamp black carbon black, with an average particle diameter in a range of from 100 to 160 nanometers demonstrate a combination of effective reheat temperatures at the exit of infrared ovens in the stretch blow molding process with exceptional color and clarity. Lamp black carbon black is typically made from high purity paraffin wax or oils. Lamp black carbon black is also referred to as pigment black 6.

In a preferred embodiment of this invention, a polyester or co-polyester resin composition is provided, comprising a polyester or co-polyester resin and a carbon black with an average primary particle size in a range of 100 to 160 nanometers. The average primary particle size of the carbon black, according to other embodiments, may be in a range of 102 to 150 nm, or preferably in a range of 105 to 145 nm, more preferably 106 to 130 mn, 107 to 125 mn, 108 to 120 nm, 109 to 115 nm, 109.5 to 112.5 nm, or about 110 nm. Preferable average primary particle sizes include any whole, half or quarter integer between 100 and 160 nm, i.e. 100.25, 100.5, 100.75, 101, . . . 159.5, 159.75, and 160. In a preferred embodiment of the invention, the carbon black is a lamp black carbon black. The primary particles may also be present in the form of agglomerates.

The composition is preferably one in which the carbon black is comprised in the resin at a concentration in a range of 1 ppm to 20 ppm, more preferably, 2 to 10 ppm, more preferably, 5 to 8 ppm, more preferably 6.5 to 7.5 ppm, most preferably about 7 ppm or exactly 7 ppm, by weight of the resin. Other preferred embodiments may comprise a minimum of 3, 4, 6, 10, or 15 ppm. Further embodiments may comprise a maximum of 19, 17, 14, 12. or 11 ppm carbon black. The preferred relative amount of carbon black may vary based on the particular resin used. The carbon black is preferably a lamp black carbon black, preferably produced by the lamp black process, and is also referred to as (CI) Pigment Black 6 or CI: 77266.

The carbon black may be added in powder form or in the form of a mixture in a liquid, e.g. a dilute slurry, a suspension, or a dispersion. Examples of dispersions are FLAMRUSS 101® or LAMP BLACK 101® lamp black carbon black from Degussa, now Orion Engineered Carbons, while other forms of lamp black carbon black sold as trademarked products include CARBON BLACK BV® and CARBON BLACK V®, DUREX®, EAGLE GERMANTOWN®, MAGECOL®, TINOLITE®, and TORCH BRAND®. The mixture of the carbon black in liquid, such as in a dilute slurry, a suspension, or a dispersion, may be aqueous or in an alcohol, such as ethylene glycol. There are essentially no limits on the concentration of useful mixtures of carbon black in liquid, but preference in some circumstances may be given to dispersions of 1, 2, 3, 4, 5, 10, 15, 20, 25, 30, 40, 50, or any combination of these up to, and including, 100 wt. % pigment in dispersant, while in other circumstances dilute slurries may be preferred, i.e. with a concentration of 0.01, 0.02, 0.03, 0.05, 0.1, 0.15, 0.2, 0.3, 0.5, 1, 2, 3, of 5 wt. %, or any combination of these percentages up to 5 wt %. The concentration of the mixture can be adjusted for convenience of addition to the resin and/or prepolymer.

The carbon black may be added to the resin as a masterbatch resin composition comprising polymer and the carbon black additive, which can be blended with further polymer or copolymer resins. The carbon black may also be added to oligomeric or prepolymer polyester or co-polyester precursors or pastes. The addition can be made at any stage up through the completion of the polycondensation.

One method of combining the carbon black with the resin is a process in which a powder of the carbon black is added to a ground resin, in either solid, partially molten, or molten form, generally with either concurrent or subsequent mixing, to produce a master batch of resin comprising the carbon black. Another method of combining the carbon black with the resin is to add a dispersion of the carbon black to a molten resin at any point up through the completion of the polycondensation, but generally before the ultimate desired viscosity is reached. This addition occurs preferentially before the last point in the process at which glycol (or other dispersant solvent) can be removed, in order to permit removal of the liquid (e.g. glycol) introduced with the carbon black mixture (e.g. dilute slurry, suspension, or dispersion) from the resin and maintain the desired viscosity. The combining may be carried out in either a batchwise or continuous manner. The mixing may be carried out in any manner sufficient to provide a satisfactory distribution of the carbon black particles in the resin for adequate reheat and color properties.

The polyester or co-polyester resin can essentially include any known monomer composition in the art, as long at the ultimate polymer is suitable for use as bottle or container preforms, either by itself or after blending it with one or more further polymers and/or copolymers. The composition according to the invention may comprises at least 75, 85, 90, 95, 97, 98, 99, 99.5, 99.8, or 99.9 wt. % of polyester resin, or at least 75, 85, 90, 95, 97, 98, 99, 99.5, 99.8, or 99.9 wt. % of co-polyester resin, or 100 wt. % of either, based on a weight of the total polymer components of the composition. The composition may include one or more further polymer resin components, such as polyamides, polyolefins, and/or polycarbonates. The total amount of resin in the composition, based on the weight of all components in the composition, may be at least 50 wt. %, or preferably a minimum of 60, 70, 75, 80, 85, 90, 92.5, 95, 96, 97, 97.5, 98, 98.5, 99, 99.25, 99.5, 99.75, 99.8, 99.85, 99.9, 99.99, 99.995, 99.996, 99.997, 99.9975, 99.9976, 99.9977, 99.9978, 99.9979, or 99.998, 99.9981, 99.9982, 99.9983, 99.9984, 99.9985, 99.9986, 99.9987, 99.9988, 99.9989, and any fraction of hundred-thousandths up to 99.9999 wt. %, delimited by at least the amount of carbon black in the composition.

One embodiment of the invention includes resins which have been produced by reacting monomer units of a diol and a dicarboxylic acid to form a polyester having the reacted monomer units present in an equimolar or nearly equimolar quantity. In a preferred embodiment the diol and the dicarboxylic acid material are reacted to form a polymer having the monomer units present in approximately equimolar quantities. The diol and the dicarboxylic acid may also be reacted in amounts that are not exactly equimolar in quantity. For example, the diol may be present in greater quantities than the dicarboxylic acid. During the polycondensation reaction, the excess diol is typically then removed under heat at reduced pressure.

Suitable polyesters useful in the compositions of the invention are well known in the art and are generally formed from repeat units comprising one or more carboxylic acid components selected from terephthalic acid (TPA), isophthalic acid, naphthalenedicarboxylic acid, dimethyl-2,6-naphthalenedicarboxylate (NDC), hydrolyzed 2,6-naphthalenedicarboxylic acid (HNDA), and one or more diol components selected from ethylene glycol, diethylene glycol, 1,4-cyclohexane-dimethanol, 1,3-propanediol, 1,4-butanediol, propylene glycol (1,2-propanediol), 2-methyl-1,3-propanediol, and 2,2-dimethyl-1,3-propanediol (neopentyl glycol) and mixtures thereof. Preferred polyesters of the present invention include poly(ethylene terephthalate) (PET), poly(ethylene naphthalate) (PEN), poly(ethylene isophthalate) (PEI), and poly(trimethylene terephthalate) (PTT), poly(trimethylene naphthalate) (PTN), most preferably polyethylene terephthalate) (PET).

The polyesters of the present invention can be made using processes well known to skilled artisans. Suitable polyesters can be produced in a conventional manner by the reaction of a dicarboxylic acid having 2 to 40 carbon atoms, preferably from 6 to 20 carbon atoms, more preferably from 8 to 14 carbon atoms, with one or more polyhydric alcohols such as glycols, dials or polyols, containing from 2 to 20 carbon atoms, preferably from 6 to 12 carbon atoms.

The dicarboxylic acid that may be used in certain preferred embodiments to make polyester-containing compositions according to the invention includes alkyl dicarboxylic acids having 2 to 20 carbon atoms preferably from 6 to 12 carbon atoms, and an aryl- or alkyl-substituted aryl dicarboxylic acids containing from 8 to 24 carbon atoms, preferably from 8 to 16 carbon atoms. Additionally, alkyl dicarboxylic acid diesters having from 4 to 20 carbon atoms or alkyl-substituted aryl dicarboxylic acid diesters having from 10 to 20 carbon atoms can be used.

The dicarboxylic acid component of the invention polyester may optionally be modified with up to 30 mole percent, preferably up to 25 mol percent, more preferably up to 20 mol percent of one or more different dicarboxylic acids. In another embodiment of the invention the polyester is modified with less than 10 mol %, preferably less than 8 mol %, most preferably from 3 to 6 mol % of one or more different dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Another embodiment does not employ additional dicarboxylic acids.

Examples of dicarboxylic acids to be included with terephthalic acid in the invention resin composition in major or minor proportions include phthalic acid, isophthalic acid, naphthalene-2,6-dicarboxylic acid (and also the 1,4-, 1,5-, 2,7-, and 1,2-, 1,3-, 1,6-, 1,7-, 1,8-, 2,3-, 2,4-, 2,5-, 2,8-isomers), cyclohexanedicarboxylic acid, cyclohexanediacetic acid, diphenyl-4,4'-dicarboxylic acid, succinic acid, glutaric acid, adipic acid, azelaic acid, sebacic acid, dibenzoic, hexahydrophthalic, bis-p-carboxy-phenoxyethane, and mixtures thereof and the like. Preferred dicarboxylic acids include isophthalic and terephthalic acids. In a preferred embodiment, these co-monomers may be used individually in amounts of 1% or higher, preferably 2% or higher, more preferably 3% or higher, most preferably 4% or hiaher or collectively in amounts of 4% or higher, preferably 5% or higher, and more preferably 6% or higher.

In a preferred embodiment of the invention the polyester matrix resin comprises from 5 to 30 mol % of isophthalic acid and from 1 to 15 mol % of a naphthalene dicarboxylic acid, more preferably from 2 to 10 mol % of the naphthalene dicarboxylic acid, even more preferably from 4 to 8 mol % of the naphthalene dicarboxylic acid, in the form of reacted monomer units.

Terephthalate polyesters for clear container applications are typically made from either a terephthalic acid and ethylene glycol, or from a terephthalic acid and a 1,4-cyclohexane diol. Suitable dicarboxylic acids include terephthalic acid, isophthalic acid, malonic, succinic, glutaric, adipic, suberic, sebacic, maleic and fumaric acid, all of which are well known dicarboxylic acids, or mixtures of these such that a copolyester is produced. Esters of dicarboxylic acids used to make the polyester or co-polyester may contain one or more C1-C6 alkyl groups (e.g., methyl, ethyl, propyl, isopropyl, butyl, iso-butyl, tert-butyl, pentyl, hexyl and mixtures thereof) in the ester unit, for example, dimethyl terephthalate (DMT).

Polyhydric glycols or diols containing from 2 to 8 carbon atoms are preferred, and those having 2 to 6, 2 to 4, or 2 to 3 carbons are more preferred. Most preferably the diol includes ethylene glycol. Glycol ethers or diol ethers having from 4 to 12 carbon atoms may be substituted for the glycol or diol. Suitable glycols, in addition to ethylene glycol and 1,4-cyclohexanedimethanol (CHDM), include diethylene glycol, propylene glycol (1,2-propane diol), 1,3-propanediol, 2-methyl-1,3-propanediol, 2,2-dimethyl-1,3-propanediol (neopentyl glycol), 1,2-butanediol, 1,4-butanediol, pentaerythritol, similar glycols and dials, and mixtures thereof. These compounds and the processes for making polyesters and copolyesters using the compounds are all well known in the art.

In addition, the glycol component may optionally be modified with up to 15 mole percent, preferably up to 10 mole percent, more preferably up to 5, 4, 2, or 1 mole percent of one or more different diols other than ethylene glycol. Such additional diols include cycloaliphatic diols preferably having 6 to 20 carbon atoms or aliphatic diols preferably having 3 to 20 carbon atoms. Examples of such diols include diethylene glycol, triethylene glycol, propylene glycol, 1,4-cyclohexanedimethanol, propane-1,3-diol, butane-1,4-diol, pentane-1,5-diol, hexane-1,6-diol, hexane-1,4-diol, 1,4-cyclohexanedimethanol, 3-methylpentanediol-(2,4), 2-methylpentanediol-(1,4), 2,2,4-trimethylpentanediol-(1,3), 2-ethylhexanediol-(1,3), 2,2-diethylpropanediol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetra-methyl-cyclobutane, 2,2-bis-(3-hydroxyethoxyphenyl)-propane, neopentyl glycol, 2,2-bis-(4-hydroxypropoxyphenyl)-propane, mixtures thereof and the like.

Polyesters may be prepared from two or more of the above diols. The polyester may also contain small amounts of trifunctional or tetrafunctional comonomers, such as trimellitic anhydride, trimethylolpropane, pyromellitic dianhydride, pentaerythritol, and other polyester forming polyacids or polyols generally known in the art.

The PET compositions of the invention may contain a PET resin that contains copolymerized IPA monomer units. The invention encompasses at least a low-IPA and a high-IPA PET resin. For example, a low-IPA composition (i) which contains a PET resin having an amount of IPA monomer units of up to 6% by mol. In a preferred embodiment the low-IPA PET resin contains up to 5 mol of IPA monomer units. Most preferably, the low-IPA PET resin contains from 2-4 mol % of polymerized IPA monomer units based upon the total number of moles dicarboxylic acid monomer units. Hereinafter, the PET resin containing a low amount of IPA monomer units is referred to as the low-IPA PET resin. Another PET resin is a high-IPA PET resin, for example (ii) high-IPA PET resin wherein IPA monomer units are present in an amount of from 10-30 mol %, preferably from 15-28%, more preferably from 20-25% and most preferably about 25% by mol based on the total number of moles of dicarboxylic acids in the PET polymer. Other ranges include 10-28%, 12-30%, and all ranges and subranges appearing between and any of 14%, 16%, 18%, 20%, 22%, 24%, and 26% and/or the above stated ranges.

In another preferred embodiment, the PET compositions of the invention may include a PET matrix resin such as the low-IPA resin or the high-IPA resin described above together with one or more additives such as an inorganic filler or a further resin. Preferably, a composition comprising the low-IPA resin contains from 2-8% by weight of a resin, where % by weight is based on the total weight of the composition. More preferably, the further resin is present in the low-IPA PET matrix resin in an amount of from 3-6% by weight, and even more preferably the further resin is present in an amount of from 4-5% by weight.

In another preferred embodiment, the PET composition of the invention contains the high-IPA resin as a matrix and a further resin. The further resin is preferably present in the matrix of the high-IPA PET resin in an amount of up to 1% by weight, preferably less than 1% by weight, more preferably up to 0.5% by weight and most preferably less than 0.4% by weight where percent by weight is based on the total weight of the composition.

Also, although not required, other additives normally used in polyesters and/or other thermal plastic compositions, may be present in the invention resin composition. Such additives may include, but are not limited to, colorants, toners, pigments, glass fibers, fillers, impact modifiers, antioxidants, stabilizers, flame retardants, reheat aides, acetaldehyde-reducing compounds, oxygen scavengers, barrier enhancing aides and mixtures thereof. Antiblock agents may also be present together with other lubricants. Fillers may include organic or inorganic materials, such as clays, or other polymeric materials.

Inorganic filler may be present in the resin an amount of 0.05 to 2.0% by weight based on the total weight of the composition. More preferably, the inorganic filler is present in an amount of 0.1 to 2.0% by weight, even more preferably from 0.5 to 1.5% by weight and most preferably the inorganic filler is present in an amount of about 1% by weight.

An organic filler may preferably be present in an amount of up to 10% by weight. More preferably the organic filler is present in an amount of from 1 to 8% by weight. Even more preferably the organic filler is present in an amount of from 3 to 6% by weight based on the total weight of the composition. Most preferably the organic filler is present in an amount of about 5% by weight.

The polymeric polyester composition (e.g., PET composition) may be mixed with a polymer filler such as a powdered amide-based polymer (e.g., nylon) or other thermoplastic materials.

Suitable catalysts for producing resins of this invention can be any catalyst for polymerizing polyesters, including, but not limited to, catalysts based on antimony, titanium, germanium, or zinc, or combinations thereof.

The polyester or co-polyester resin used in the present invention, or the resin composition, may have an intrinsic viscosity (IV) of from 0.60 to 0.95, more preferably 0.65 to 0.90, 0.68 to 0.88, 0.75 to 0.85, 0.77 to 0.87, or 0.80 to 0.85. In some circumstances, an IV of from 0.72 to 0.76 for, e.g., for water bottle applications, or from 0.81 to 0.85, e.g., for CSD/Beer bottles, may be desirable.

The color of the resin or composition may be measured according to the Hunter Lab color scale: color L, color b, and color a, or the CIE color scale: color L*, color b*, and color a*. Values for color L* of the preform according to an embodiment of the invention can vary between 66.0 and 82.0. Preferably, the minimum color value L* is at least 68.0, or at least 69.0, 70.0, 70.5, 70.75, or 71.0, which preferable maxima may be no greater than 80.0, 78.0, 76.0, 75.0, 74.0, 73.75, or 73.5. The color of a desirable polyester composition may have an a* coordinate value preferably ranging from minus 4.4 to plus 1.6, or minus 2.0 to plus 0.5 or from minus 2.0 to plus 0.1. With respect to a b* coordinate value, a preform may have a b* value coordinate ranging from −8.6 to +10.2, or from −3.0, or from −1.5, to a positive value of less than 5.0, or less than 4.0, or less than 3.8, or 3.0 or less, or 2.6 or less.

Haze percentage values of preforms according to the invention may be up to 10%, preferably no more than 7%, or no more than 6.75, 6.5, 6.25, 6, 5.75, 5.5, 5.25, or 5%. Any fractional diminution in these haze values of 0.2, 0.15, 0.10, or 0.05% may achieved according to embodiments of the invention.

The increased reheat temperature differential using the carbon black according to the invention over resins without a reheat additive can be at least 4° C., more preferably at least 5, 6, 7, 8, 9, 10, 11, 12, 13, 14, or 15° C. Fractions of these differentials are also achievable, such as any combination of 0.01, 0.02, 0.03, 0.04, 0.05, 0.10, 0.15, 0.20, 0.25, 0.30, 0.35, 0.40, 0.45, and/or 0.50 with any of these reheat differentials. The desired reheat temperature differential may be balanced against the L* color value by selecting the amount of carbon black added (e.g. any amount described above), and optionally be selecting particular resin compositions, blends, and/or monomer components of these.

Using the carbon black with a particular average particle diameter in a particular concentration, as defined above, a variety of optimized properties, including reheat performance, haze %, and color quality in preforms can be achieved concurrently.

The present inventors have found that an optimum exists for maximizing preform reheat temperature while maintaining good preform clarity and L* color value. Surprisingly, the carbon blacks according to the invention, particularly lamp black carbon blacks, provide a faster reheat than the furnace carbon blacks, but show an improvement in haze at equivalent reheat temperatures compared to the thermal carbon blacks. Certain aspects of the invention are elucidated by the following example which is not intended to be limiting as to the scope of the invention.

Example

Resin samples were produced by mixing the specific carbon black powder with ground PET resin containing no reheat additive to form a masterbatch. The masterbatch resin was then mixed into PET resin containing no reheat additive using a twin screw extruder. The masterbatch concentration was maintained in the twin screw extruder using a loss-in-weight feeder set at a fixed ratio with the twin screw extruder feed rate. Each of the carbon black species was produced at two different concentrations.

The carbon black species tested, each with the two different concentrations, are listed in the table below:

TABLE 1

| Ex. No. | Additive | Concentration (ppm) | Primary Particle Size (nm) |
|---|---|---|---|
| 1 | Reduced Antimony Particles | — | — |
| 2 | No Reheat Additive | — | — |
| 3 | Thermal carbon black | 11 | 290 |
| 4 | Thermal carbon black | 5 | 290 |
| 5 | Furnace carbon black | 4 | 25 |
| 6 | Furnace carbon black | 2 | 25 |
| 7 | Lamp black carbon black | 6 | 110 |
| 8 | Lamp black carbon black | 4 | 110 |
| 9 | Furnace carbon black | 5 | 60 |
| 10 | Furnace carbon black | 3 | 60 |

Two resins, one with reduced antimony particles and another no reheat additive, were used as controls for the example. Following the addition of the reheat additives, each resin was crystallized and solid stated in a rotary vacuum dryer to a final SSP IV of 0.80 dl/g.

The resins were processed into preforms using a single cavity Arburg injection machine with a 48 gram preform having a 4.06 mm thickness at the 1.5 inches below the top of the finish. The preforms were processed at optimum injection molding conditions to yield preforms with no visible defects. A set of six preforms from each carbon black type was measured for preform color and haze by Plastic Technologies, Inc. in Holland, Ohio.

The preforms from the resin set with reduced metallic antimony particles were processed into 2-liter bottles with good material distribution to establish the oven conditions for the reheat testing. The reheat test measured the prefotm temperature at the exit of the oven at a fixed position and 1.5 inches below the top of the finish on the preform. The preform temperature was measured for each carbon black type at 60, 65, 70, 75 and 80% oven output using three preforms per oven output. The resulting linear equation of preform temperature versus oven output was used to give a calculated preform temperature at 70% output.

Figure 1:
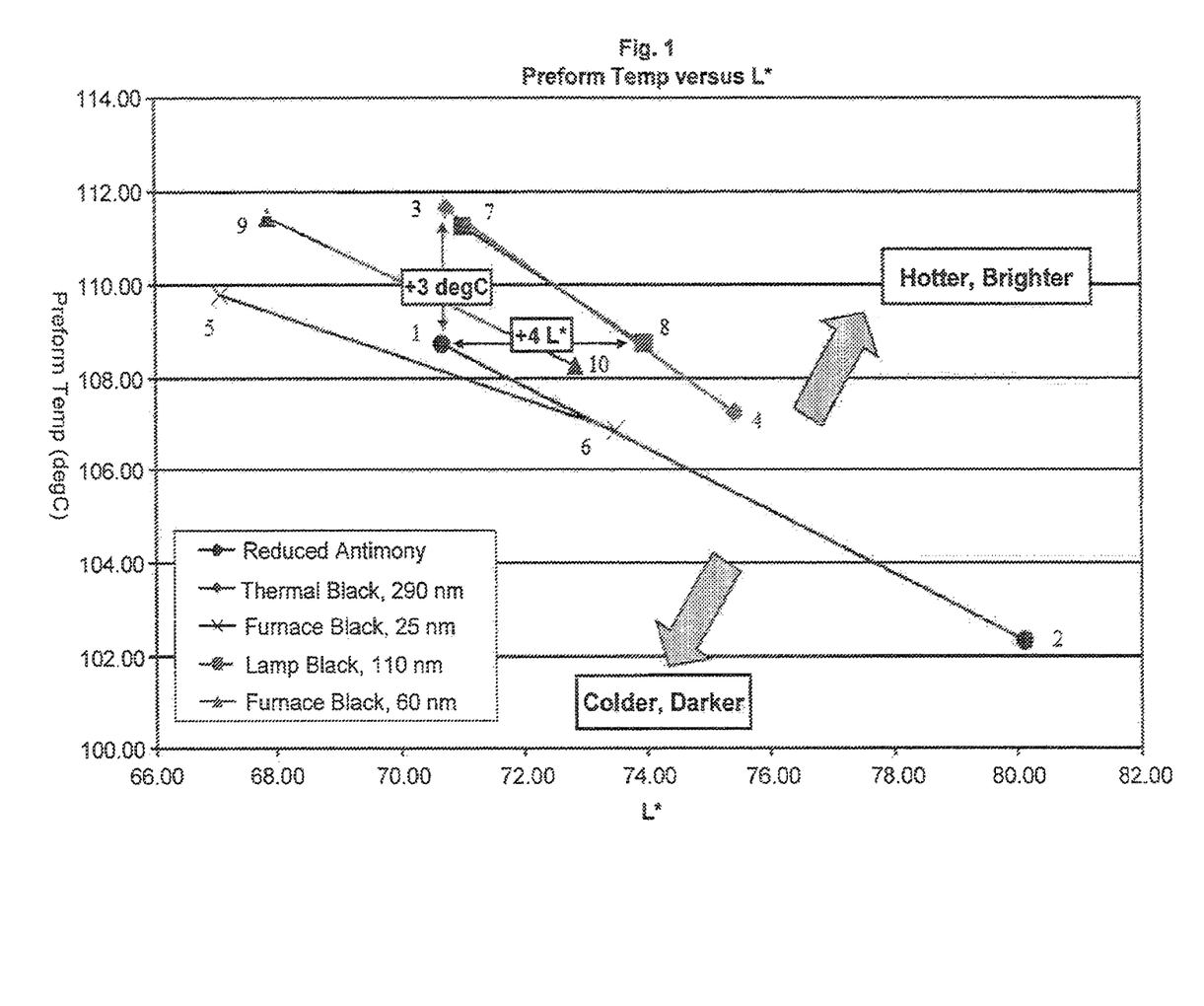
FIG. 1 shows the relationship between preform reheat temperature and preform L* color value for each of the carbon black types at two different concentrations.

FIG. 1 shows the relationship between preform temperature and preform L* color for each of the carbon black types. The figures show that the relationship between reheat rate and L* color is virtually the same for the lamp black carbon black and the thermal carbon black. Both the lamp black carbon black and the thermal carbon black were much better than either furnace carbon black or the controls.

Figure 2:
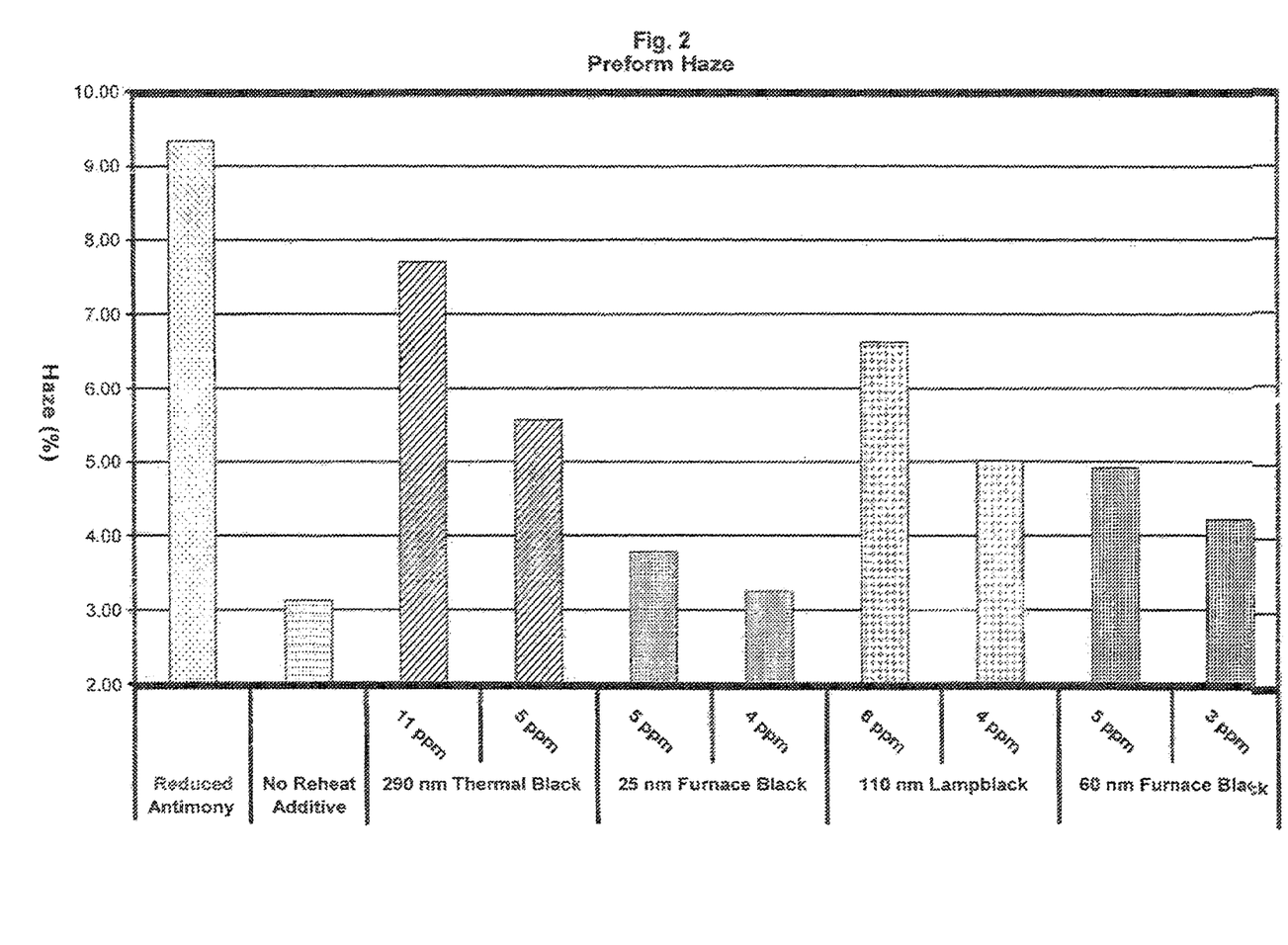
FIG. 2 shows the % haze value for preforms with each of the reheat additive types and concentrations.

FIG. 2 shows the preform haze of each of the carbon black types at two concentrations. In this figure, the furnace carbon blacks have excellent clarity, but the lamp black carbon black shows additional improvement over the thermal carbon blacks.

Figure 3:
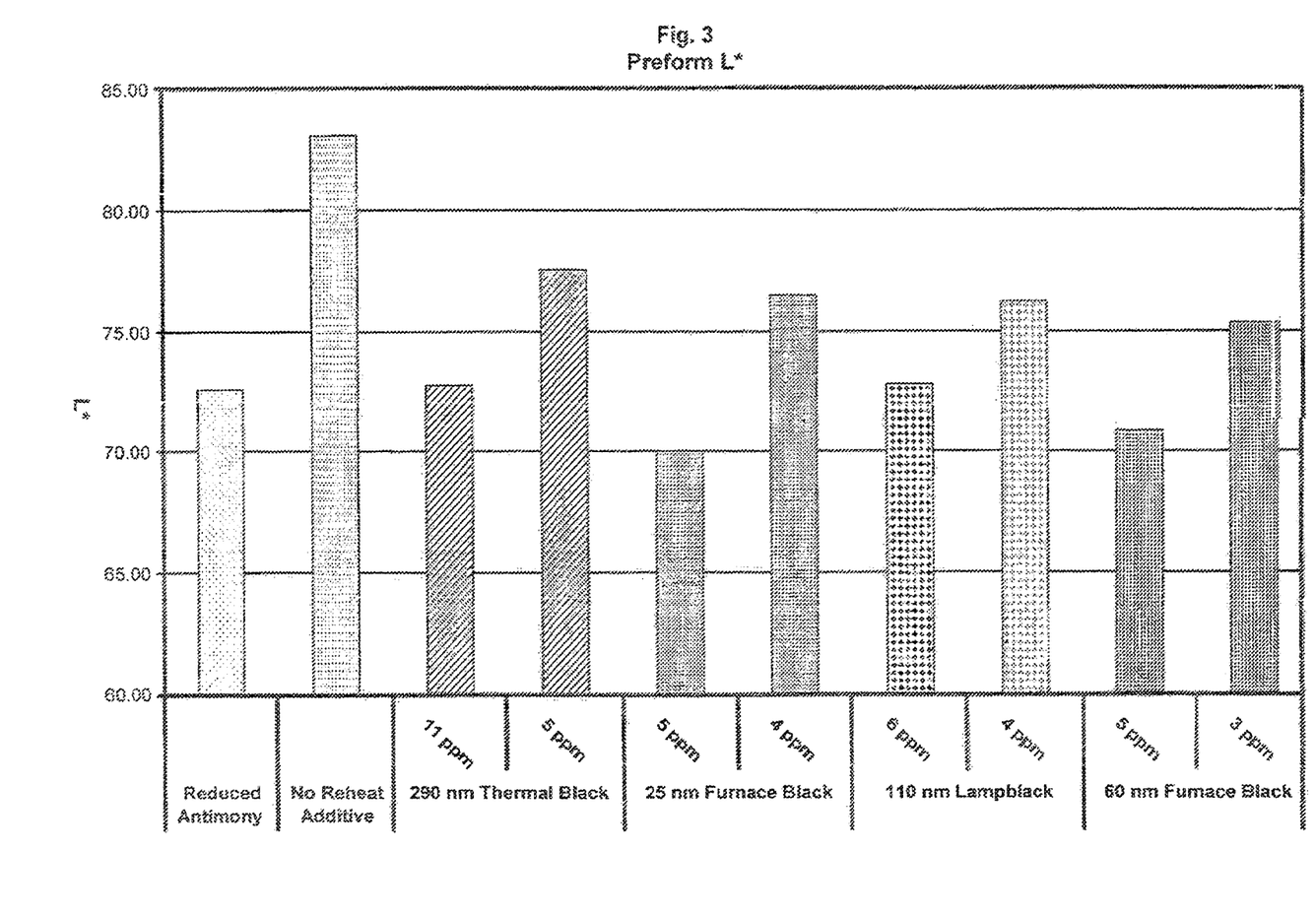
FIG. 3 shows the L* color value for preforms with each of the reheat additive types and concentrations.
Figure 4:
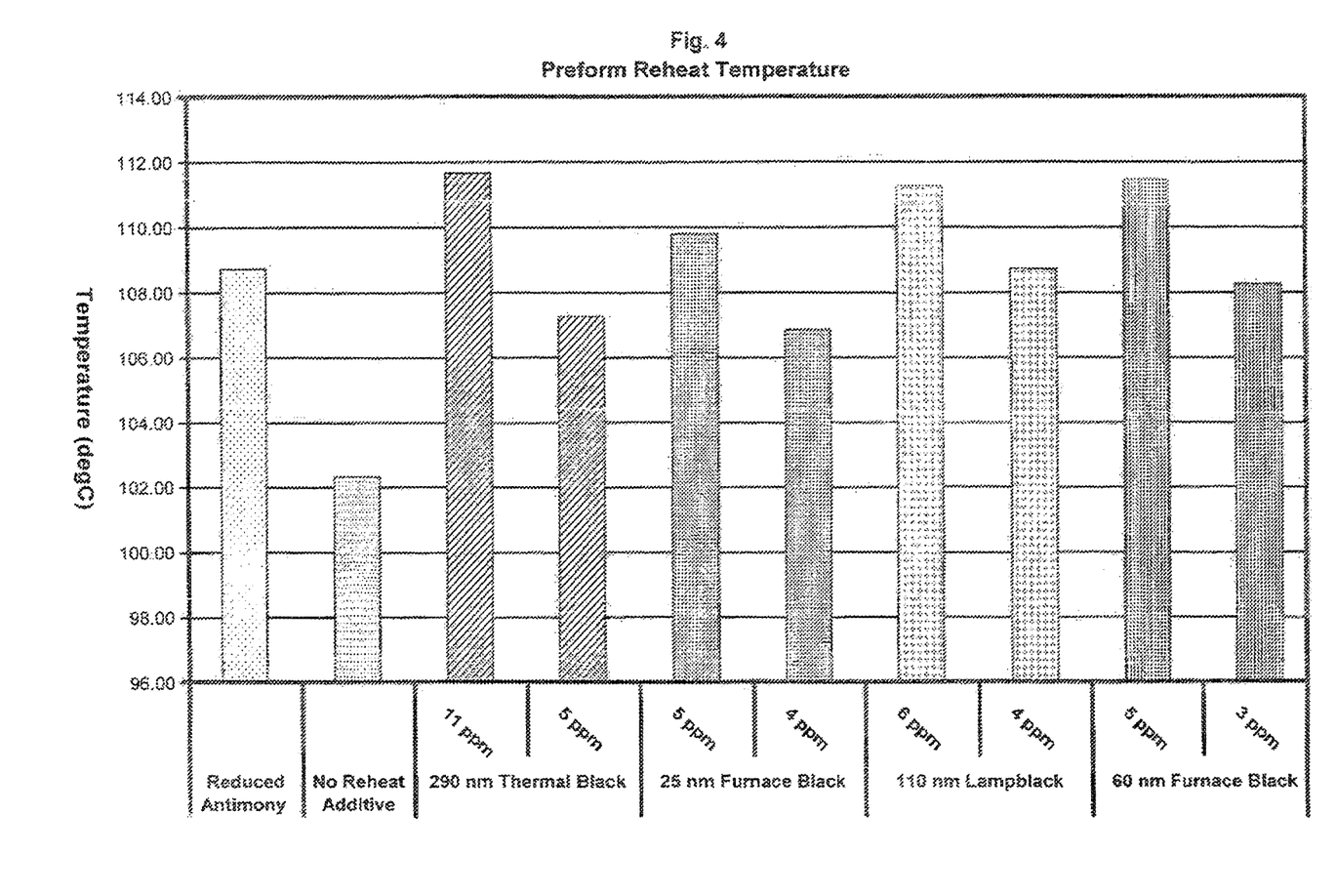
FIG. 4 shows the preform reheat temperature value for preforms with each of the reheat additive types and concentrations.

FIGS. 3 and 4 show the preform L* color and reheat temperatures for each of the carbon black types.

The invention claimed is:

1. A method of improving the reheat and color value L* of a preform and forming a clear bottle, the method comprising:
    mixing a lamp black carbon black with a first co-polyester resin in molten form to form a lamp black carbon black composition,
    mixing the lamp black carbon black composition and a second co-polyester resin to form a molding composition, wherein the second co-polyester resin does not contain a reheat additive, a colorant or a pigment other than the lamp black carbon black,
    injection molding the molding composition into a mold to form the preform, wherein the preform has a CIE L* of at least 70 and a haze of no more than 7%,
    heating the preform with infra-red heat, then
    stretch-blow molding the infra-red heated preform to form the clear bottle,
    wherein the lamp black carbon black has an average primary particle size of from 106 to 130 nm,
    wherein the lamp black carbon black is present in the clear bottle at a concentration of from 3 ppm to 11 ppm by weight of the first and second resin compositions,
    wherein the temperature of the heated preform during the injection molding is at least 8° C. higher than the temperature of an equivalently heated preform in the absence of the lamp black carbon black, and
    wherein the first and second co-polyester resins comprise 70-95 mol % of reacted units of terephthalic acid and 5-30 mol % of reacted units of isophthalic acid, wherein mol % is based on the total number of mols of dicarboxylic acid units in the second co-polyester resin, and reacted units of polyethylene glycol.

2. The method of claim 1, wherein the temperature of the heated preform is at least 110° C. during the stretch-blow molding.

3. The method of claim 1, wherein the first copolyester resin and the second co-polyester resin do not comprise residues of an antimony catalyst.

4. The method of claim 1, wherein the injection molding forms a preform having a haze of no more than 6.75%.

5. The method of claim 1, wherein the injection molding forms a preform having an L* value of from 70 to 80.

6. The method of claim 1, wherein the injection molding forms a preform having an L* value of greater than 75.

7. The method of claim 1, wherein the average primary particle size of the lamp black carbon black is about 110 nm.

8. The method of claim 7, wherein the lamp black carbon black is present in the clear bottle at a concentration of from 4 ppm to 6 ppm.

* * * * *